(12) United States Patent
Hendrix et al.

(10) Patent No.: US 7,253,930 B2
(45) Date of Patent: Aug. 7, 2007

(54) SCANNER DRIVE SYSTEM

(75) Inventors: Steven Wayne Hendrix, Jamul, CA (US); David Bradley Short, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 888 days.

(21) Appl. No.: 10/199,046

(22) Filed: Jul. 19, 2002

(65) Prior Publication Data

US 2004/0012823 A1   Jan. 22, 2004

(51) Int. Cl.
H04N 1/04 (2006.01)

(52) U.S. Cl. .............. 358/474; 358/505; 358/497; 358/496; 358/498; 399/206; 399/186

(58) Field of Classification Search ............ 358/474, 358/505, 497, 496, 498, 471; 399/209, 206, 399/186, 386
See application file for complete search history.

(56) References Cited

U.S. PATENT DOCUMENTS

| | | |
|---|---|---|
| 1,854,014 A | 4/1932 | Ballentine |
| 3,380,339 A | 4/1968 | Moss |
| 3,383,982 A | 5/1968 | Moss |
| 3,953,123 A | 4/1976 | Jesensky et al. |
| 4,092,632 A | 5/1978 | Agulnek |
| 4,152,728 A | 5/1979 | Camerik |
| 4,268,870 A | 5/1981 | Kitamura et al. |
| 4,346,984 A | 8/1982 | Kingsley |
| 4,434,659 A | 3/1984 | Kurtz et al. |
| 4,553,174 A | 11/1985 | Moriguchi et al. |
| 4,623,239 A | 11/1986 | Zambelli |
| 4,705,958 A | 11/1987 | Sugita |
| 4,806,977 A | 2/1989 | Mizutani et al. |
| 5,113,224 A * | 5/1992 | Tsuda et al. .......... 399/213 |
| 5,113,225 A | 5/1992 | Deguchi |
| 5,184,217 A | 2/1993 | Doering |
| 5,237,127 A | 8/1993 | DeCecca et al. |
| 5,379,095 A | 1/1995 | Oishi |
| 5,523,876 A | 6/1996 | Tellam et al. |
| 5,596,563 A | 1/1997 | Maeng |
| 5,610,731 A | 3/1997 | Itoh |
| 5,734,483 A | 3/1998 | Itoh |
| 5,777,978 A | 7/1998 | Ota et al. |
| 5,845,180 A | 12/1998 | Tsai |
| 5,873,308 A | 2/1999 | Taira |
| 5,886,977 A | 3/1999 | Ota et al. |
| 6,005,686 A | 12/1999 | Hong |

(Continued)

FOREIGN PATENT DOCUMENTS

JP       61-4360      1/1986

(Continued)

OTHER PUBLICATIONS

British Examination Report dated Apr. 1, 2005.

*Primary Examiner*—Aung S. Moe
*Assistant Examiner*—Negussie Worku

(57) ABSTRACT

A drive system for an optical imaging head assembly of a scanner includes a rack having a first side and a second side opposite the first side, the first side including a toothed surface and the second side including a guide surface, a pinion engaged with the toothed surface of the rack, and at least one guide member contacting the guide surface of the rack.

45 Claims, 5 Drawing Sheets

U.S. PATENT DOCUMENTS

| | | |
|---|---|---|
| 6,072,602 A | 6/2000 | Sun et al. |
| 6,091,516 A | 7/2000 | Chang et al. |
| 6,132,026 A * | 10/2000 | Taylor et al. ............... 347/32 |
| 6,169,611 B1 * | 1/2001 | Brook et al. ............... 358/487 |
| 6,246,492 B1 * | 6/2001 | Chang et al. ............... 358/497 |
| 6,328,412 B1 | 12/2001 | Taylor et al. |
| 6,335,802 B1 * | 1/2002 | Hung-Che et al. ......... 358/296 |
| 6,373,613 B1 | 4/2002 | Sheng |

FOREIGN PATENT DOCUMENTS

| | | |
|---|---|---|
| JP | 61-4361 | 1/1986 |
| JP | 61-4362 | 1/1986 |
| JP | 61-4363 | 1/1986 |
| JP | 1320859 | 12/1989 |
| JP | 5-113612 | 5/1993 |
| JP | 5-297476 | 11/1993 |
| JP | 6-148757 | 5/1994 |
| JP | 6-289502 | 10/1994 |
| JP | 6-332079 | 12/1994 |
| JP | 7-140562 | 6/1995 |

* cited by examiner

SCANNER DRIVE SYSTEM

BACKGROUND

A scanning system used for scanning a medium and reproducing an image of the medium may include a light source and a sensor array, such as a charge coupled device (CCD) or contact imaging sensor (CIS), which includes light receptors which can detect variations in light intensity and frequency. As such, the light source illuminates a surface of the medium and the sensor array converts reflected light from the surface into electrical signals. Thus, the electrical signals can then be stored in a file, manipulated by programs, and/or used for reproduction of the image.

In one arrangement, the light source and the sensor array are advanced relative to the medium to scan the medium and capture the image. To advance the light source and the sensor array relative to the medium, the scanning system may include a carriage which supports the light source and the sensor array for movement relative to the medium and a drive system which moves the carriage relative to the medium. The drive system may include a belt and pulley arrangement which is coupled to the carriage to control advancement of the carriage relative to the medium.

The belt and pulley arrangement is susceptible to slippage and/or backlash. In addition, the belt and pulley arrangement may generate vibration in the system. Thus, to reduce slippage, avoid backlash, and/or minimize vibration, the belt and pulley arrangement may include preload tensioning. This preload tensioning, however, adds to friction or drag of the belt and pulley arrangement as well as complexity and cost of the system.

SUMMARY OF THE INVENTION

A drive system for an optical imaging head assembly of a scanner includes a rack having a toothed surface and a guide surface, a pinion engaged with the toothed surface of the rack, and at least one guide member contacting the guide surface of the rack.

DESCRIPTION OF THE PREFERRED EMBODIMENTS

In the following detailed description of the preferred embodiments, reference is made to the accompanying drawings which form a part hereof, and in which is shown by way of illustration specific embodiments in which embodiments of the invention may be practiced. In this regard, directional terminology, such as "top," "bottom," "front," "back," "leading," "trailing," etc., is used with reference to the orientation of the Figure(s) being described. Because components of the embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
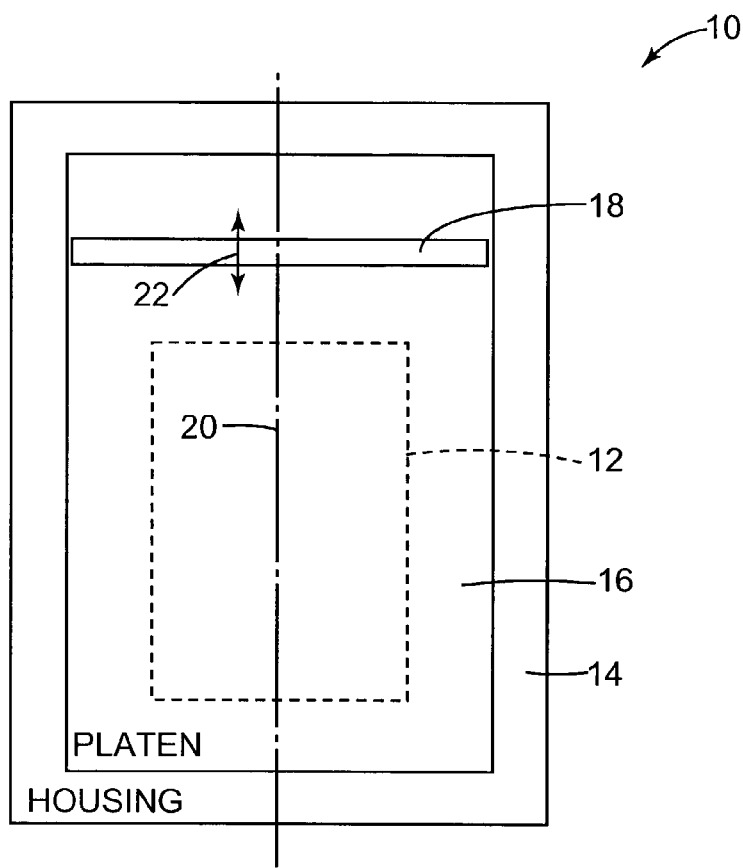
FIG. 1 is schematic illustration of one embodiment of a scanner including an optical imaging head assembly.

FIG. 1 illustrates one embodiment of a portion of a scanner 10. Scanner 10 facilitates reproduction of an image presented, for example, on a medium 12. Medium 12, as used herein, is defined to include any type of material upon which any pictorial, graphical, and/or textural image may be provided. Medium 12, therefore, is defined to include any type of sheet material such as paper, including photographic paper, card stock, transparencies, Mylar, cloth, and the like. The image, for example, may include any pictorial, graphical, and/or textural characters, symbols, illustrations, and/or other representation of information.

Scanner 10 may be a stand alone peripheral device or may be included in a peripheral device such as a printer, copier, facsimile, or other peripheral device, including a multi-functional peripheral (MFP) device which combines the functions of two or more of these devices.

Scanner 10 includes a housing 14, a platen 16, and an optical imaging head assembly 18. Platen 16 is formed of a transparent material and supported by housing 14. As such, medium 12 is positioned face down on platen 16 and scanned by optical imaging head assembly 18.

Optical imaging head assembly 18 is supported between housing 14 and platen 16 for movement relative to housing 14 and platen 16. More specifically, optical imaging head assembly 18 is supported between housing 14 and platen 16 for bi-directional movement along an axis 20 in the directions indicated by double arrow 22. Thus, optical imaging head assembly 18 traverses platen 16 to scan medium 12 and capture the image provided on medium 12, as described below.

Figure 2:
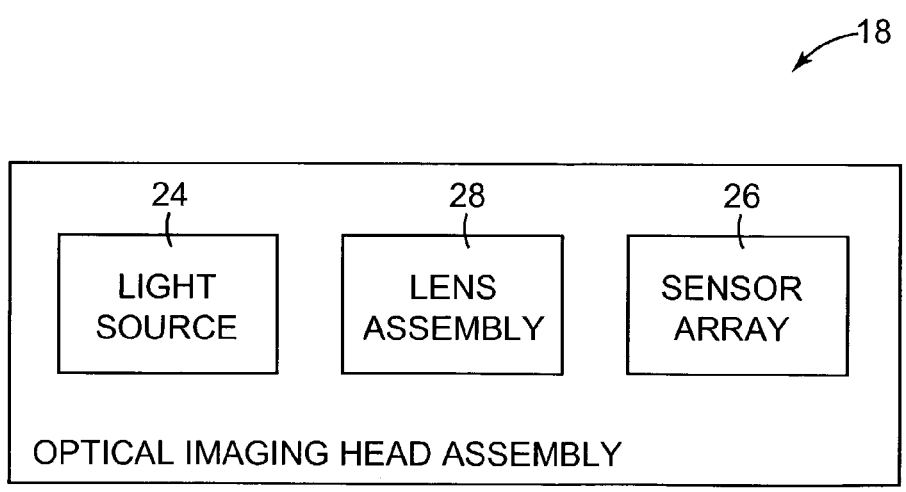
FIG. 2 is a block diagram illustrating one embodiment of the optical imaging head assembly of the scanner of FIG. 1.

In one embodiment, as illustrated in FIG. 2, optical imaging head assembly 18 includes a light source 24 which illuminates medium 12 and a sensor array 26 which converts reflected or transmitted light into electrical signals. Sensor array 26 may include a charge coupled device (CCD) used in either a contact image sensor (CIS) or an optical reduction scanner. Each element of sensor array 26 produces a data signal that is representative of an intensity and/or color of light from a small area, commonly referred to as a picture element or pixel, of medium 12. As such, scanner 10 constitutes an input device which receives input in graphical form and converts the input into digital data.

In one embodiment, optical imaging head assembly 18 includes a lens assembly 28 which directs reflected or transmitted light to sensor array 26. Thus, lens assembly 28 is optically positioned between the reflected or transmitted light of light source 24 and sensor array 26. Lens assembly 28 includes, for example, one or more mirrors, lens, or other optic elements which direct or focus reflected or transmitted light to or on sensor array 26.

Figure 3:
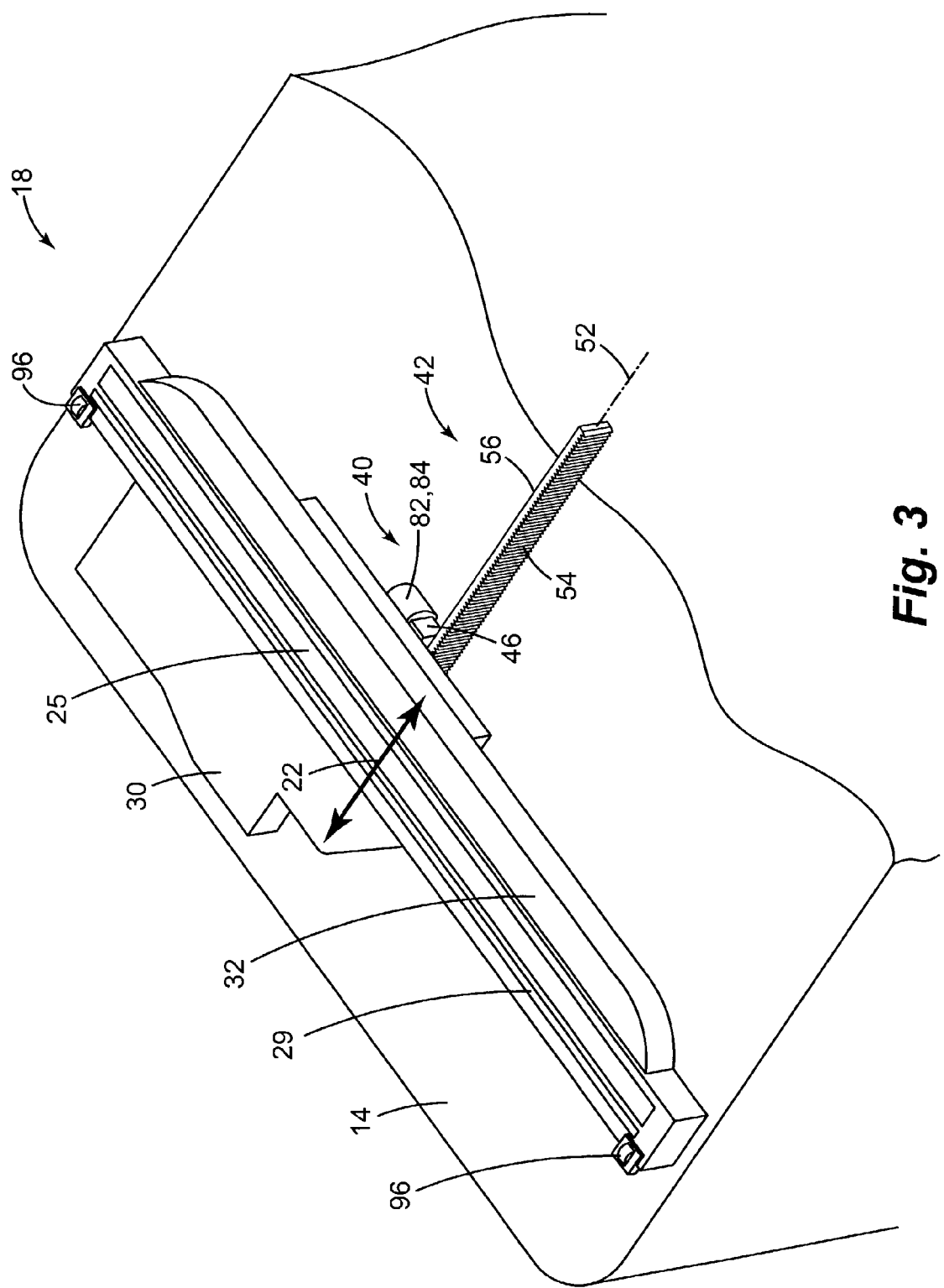
FIG. 3 is a top perspective view illustrating one embodiment of a portion of a scanner including one embodiment of an optical imaging head assembly.

As illustrated in the embodiment of FIG. 3, optical imaging head assembly 18 includes a carriage 30 which supports light source 24, sensor array 26, and lens assembly 28. More specifically, carriage 30 supports light source 24, sensor array 26, and lens assembly 28 for movement relative to housing 14 and platen 16 (FIG. 1). For clarity of the invention, platen 16 has been removed from the embodiment illustrated in FIG. 3.

In one embodiment, carriage 30 includes a housing 32 in which sensor array 26 is mounted. In addition, light source 24 includes a light bar 25 supported by housing 32 and lens assembly 28 includes a lens 29 supported by housing 32. As such, light bar 25 and lens 29 extend between opposite sides of scanner 10 so as to span a width of platen 16.

Figure 4:
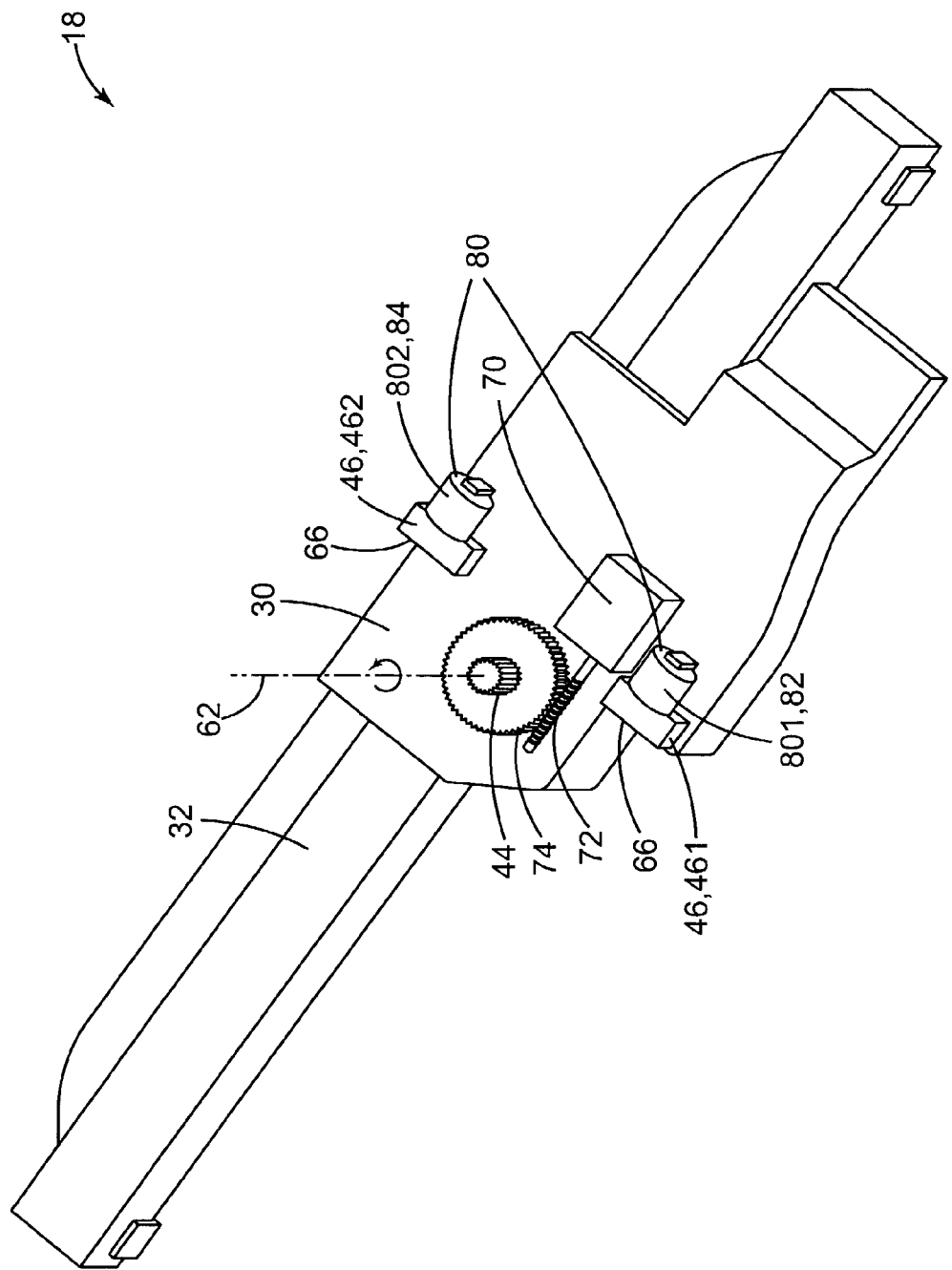
FIG. 4 is a bottom perspective view illustrating one embodiment of the optical imaging head assembly of FIG. 3.
Figure 5:
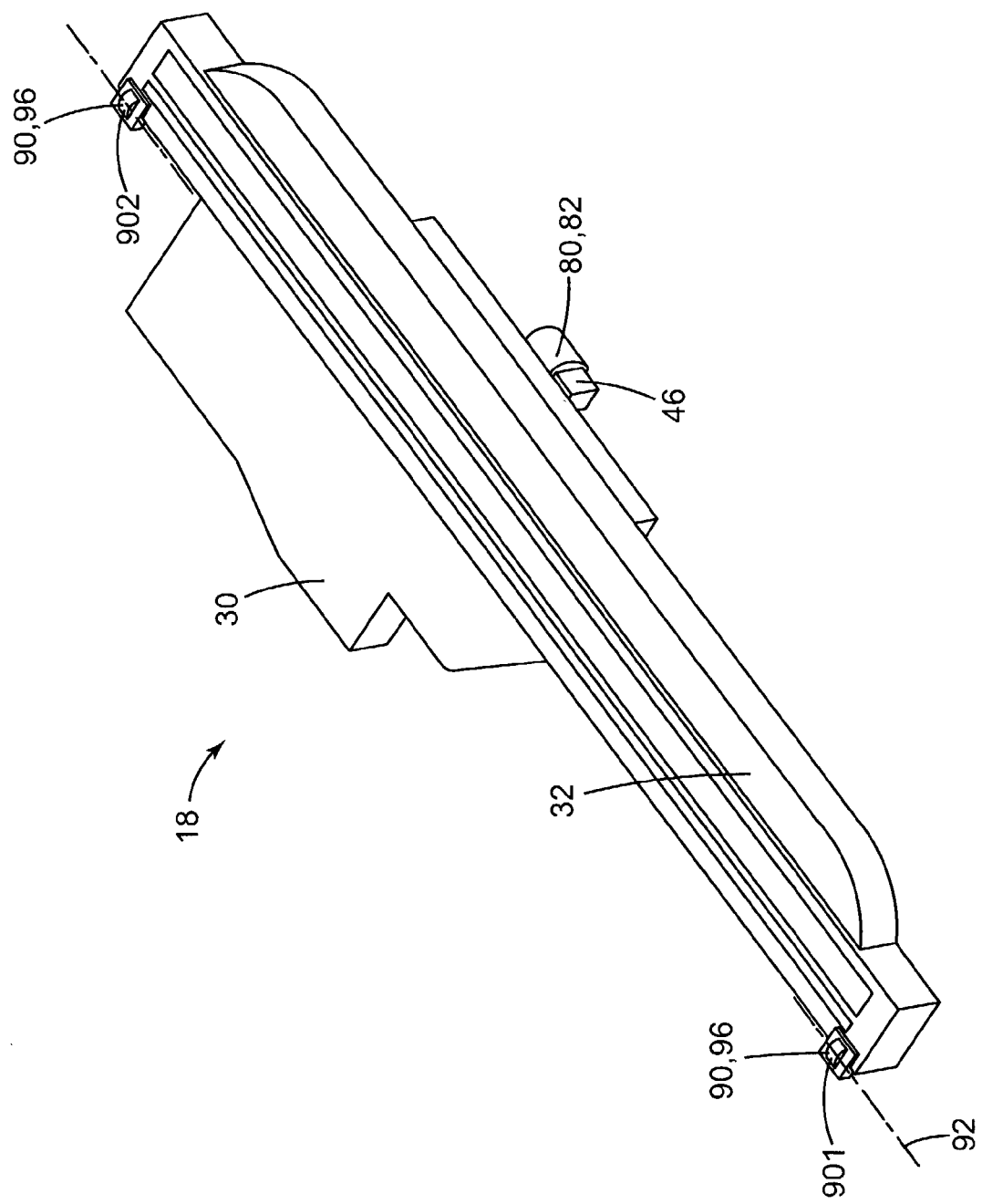
FIG. 5 is a top perspective view illustrating one embodiment of the optical imaging head assembly of FIG. 3.

To move or advance optical imaging head assembly 18 relative to housing 14 and platen 16, scanner 10 includes an embodiment of a drive system, such as drive system 40. In one embodiment, as illustrated in FIGS. 3–5, drive system 40 includes an embodiment of a rack, such as rack gear 42, an embodiment of a pinion, such as pinion gear 44, and an embodiment of a guide member, such as guide member 46. Pinion gear 44 is engaged with rack gear 42 and traverses rack gear 42 to move or advance optical imaging head assembly 18 along rack gear 42, as described below. Guide member 46 contacts rack gear 42 and slides relative to rack gear 42 to guide optical imaging head assembly 18 along rack gear 42, as described below.

Rack gear 42 is supported by housing 14 of scanner 10 and has a longitudinal axis 52 extending in the direction of advance indicated by double arrow 22. Rack gear 42 has a toothed surface 54 and a guide surface 56 for interaction with pinion gear 44 and guide member 46, respectively, as described below. In one embodiment, guide surface 56 is opposite toothed surface 54. As such, pinion gear 44 is positioned on one side of rack gear 42 and guide member 46 is positioned on an opposite side of rack gear 42.

Pinion gear 44 is supported by carriage 30 of optical imaging head assembly 18 for bi-directional rotation about an axis 62 oriented substantially perpendicular to longitudinal axis 52 of rack gear 42. Pinion gear 44 is engaged with toothed surface 54 of rack gear 42 such that rotational motion of pinion gear 44 causes pinion gear 44 and, more specifically, carriage 30 to traverse rack gear 42. As such, rotational motion of pinion gear 44 moves or advances optical imaging head assembly 18 along rack gear 42 in the directions indicated by double arrow 22.

Guide member 46 is supported by carriage 30 of optical imaging head assembly 18 and includes a guide surface 66. Guide surface 66 of guide member 46 contacts guide surface 56 of rack gear 42 such that guide member 46 slides along rack gear 42. As such, guide member 46 guides carriage 30 along rack gear 42 as pinion gear 44 moves or advances optical imaging head assembly 18 along rack gear 42 in the directions indicated by double arrow 22.

In one embodiment, as illustrated in FIG. 4, guide member 46 includes a pair of guide members 461 and 462 supported by carriage 30. In one embodiment, guide members 461 and 462 are spaced from each other and aligned substantially parallel with longitudinal axis 52 of rack gear 42 (FIG. 3). As such, guide members 461 and 462 are substantially aligned with each other.

As pinion gear 44 moves or advances along rack gear 42, pinion gear 44 may separate from rack gear 42. With pinion gear 44 positioned on one side of rack gear 42 and guide member 46 positioned on an opposite side of rack gear 42, separation of pinion gear 44 from rack gear 42 forces or biases guide member 46 against rack gear 42. Thus, in one embodiment, a separation force of pinion gear 44 and rack gear 42 is used to bias guide surface 66 of guide member 46 against guide surface 56 of rack gear 42. To increase this separation force and, therefore, the biasing force of guide surface 66 against guide surface 56, a pressure angle between a line of rack gear 42 and a force vector created by turning pinion gear 44 is increased. As such, the larger the pressure angle, the larger the biasing force of guide member 46 against rack gear 42. Thus, the pressure angle can be selected so as to provide enough force to minimize vibration of carriage 30 while maximizing drive efficiency of a given system. In one illustrative embodiment, the pressure angle between rack gear 42 and pinion gear 44 is in a range of approximately 10 degrees to approximately 50 degrees. In another illustrative embodiment, the pressure angle between rack gear 42 and pinion gear 44 is approximately 30 degrees.

As illustrated in the embodiment of FIG. 4, drive system 40 includes a motor 70. Motor 70 may include, for example, a stepper motor or a DC motor. Motor 70 is supported by carriage 30 and drives pinion gear 44 to move or advance pinion gear 44 along rack gear 42 in the directions indicated by double arrow 22. Thus, motor 70 drives pinion gear 44 in both clockwise and counterclockwise directions.

In one embodiment, motor 70 drives a worm or worm gear 72 engaged with a drive gear 74. Drive gear 74 is rotationally coupled with pinion gear 44 such that rotation of drive gear 74 is imparted to pinion gear 44. Thus, pinion gear 44 is driven by worm gear 72 via drive gear 74. Accordingly, worm gear 72 and drive gear 74 form one embodiment of a gearing arrangement of drive system 40 for driving pinion gear 44 via motor 70. While pinion gear 44 is illustrated as being driven by worm gear 72, in alternative embodiments, pinion gear 44 may be driven by a spur gear or other gearing arrangement driven by motor 70.

In one embodiment, as illustrated in FIGS. 3 and 4, drive system 40 includes a plurality of contact members 80. Contact members 80 are supported by carriage 30 and support optical imaging head assembly 18 relative to housing 14. As such, contact members 80 contact housing 14 and follow a surface of housing 14.

In one embodiment, contact members 80 include a pair of contact members 801 and 802 supported by carriage 30. As such, contact members 801 and 802 provide two-point contact with housing 14. In one embodiment, contact members 801 and 802 are spaced from each other and aligned substantially parallel with longitudinal axis 52 of rack gear 42 (FIG. 3). As such, contact members 801 and 802 are substantially aligned with each other.

As illustrated in the embodiment of FIGS. 3 and 4, contact members 80 include rollers or wheels 82 rotatably mounted on an underside of carriage 30. As such, rollers or wheels 82 contact housing 14 and rotate relative to carriage 30 and housing 14 as optical imaging head assembly 18 traverses rack gear 42 in the directions indicated by double arrow 22. However, in alternative embodiments, one or more contact members 80 may include a sliding contact or guide which contacts and slides along housing 14 as optical imaging head assembly 18 traverses rack gear 42.

In one embodiment, at least one roller or wheel 82 is biased against housing 14. More specifically, at least one roller or wheel 82 constitutes a sprung roller or wheel 84 biased in a direction substantially perpendicular to longitudinal axis 52 of rack gear 42 (FIG. 3). As such, sprung roller or wheel 84 maintains contact with housing 14 and biases optical imaging head assembly 18 away from housing 14 and toward platen 16 as optical imaging head assembly 18 traverses rack gear 42. In one illustrative embodiment, sprung roller or wheel 84 is positioned adjacent a leading end of optical imaging head assembly 18 substantially below light source 24 and sensor array 26.

In one embodiment, as illustrated in FIG. 5, drive system 40 includes a plurality of contact members 90. Contact members 90 are supported by carriage 30 and support optical imaging head assembly 18 relative to platen 16. As such, contact members 90 contact platen 16 and follow a surface of platen 16. More specifically, contact members 90 contact and follow an underside of platen 16.

In one embodiment, contact members 90 include a pair of contact members 901 and 902 supported by carriage 30. As such, contact members 901 and 902 provide two-point contact with platen 16. In one embodiment, contact members 901 and 902 are spaced from each other and aligned along an axis 92 oriented substantially perpendicular to longitudinal axis 52 of rack gear 42 (FIG. 3). As such, contact members 901 and 902 are substantially aligned with each other.

Figure 6:
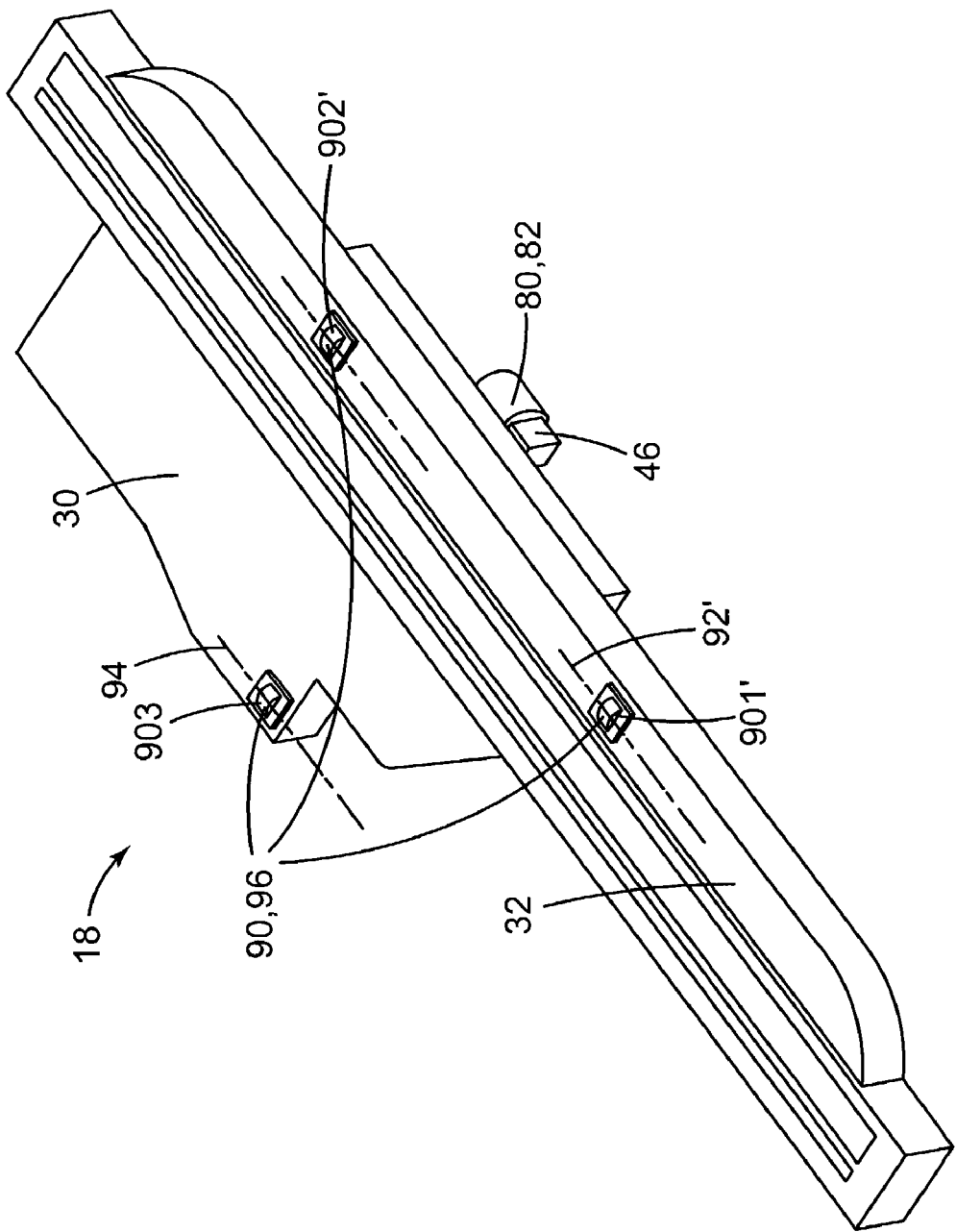
FIG. 6 is a top perspective view illustrating another embodiment of an optical imaging head assembly.

In another embodiment, as illustrated in FIG. 6, contact members 90 include a pair of contact members 901' and 902' supported by carriage 30 and a third contact member 903 supported by carriage 30. As such, contact members 901' and 902' along with contact member 903 provide three-point contact with platen 16. In one embodiment, contact members 901' and 902' are spaced from each other and aligned along an axis 92' oriented substantially perpendicular to longitudinal axis 52 of rack gear 42 (FIG. 3). As such, contact members 901' and 902' are substantially aligned with each other.

In one embodiment, contact member 903 is positioned between and offset from contact members 901' and 902'. More specifically, contact member 903 is provided along an axis 94 offset from axis 92' and oriented substantially perpendicular longitudinal axis 52 of rack gear 42 (FIG. 3). As such, contact member 903 is staggered from contact members 901' and 902'.

As illustrated in the embodiments of FIGS. 5 and 6, contact members 90 include rollers or wheels 96 rotatably mounted on a topside of carriage 30 (including housing 32). As such, rollers or wheels 96 contact an underside of platen 16 and rotate relative to platen 16 and optical imaging head assembly 18 as optical imaging head assembly 18 traverses rack gear 42 in the directions indicated by double arrow 22 (FIG. 3). It is, however, within the scope of the present invention for one or more contact members 90 to include a sliding contact or guide which contacts and slides along platen 16 as optical imaging head assembly 18 traverses rack gear 42.

By providing rack gear 42 with toothed surface 54 and guide surface 56, pinion gear 44 and guide member 46 of drive system 40 can interact with rack gear 42 to move or advance and guide optical imaging head assembly 18 relative to housing 14 and platen 16 for scanning of medium 12. In addition, by providing contact members 80 on an underside of carriage 30 and contact members 90 on a topside of carriage 30, a position and/or predetermined distance between optical imaging head assembly 18 and platen 16 can be maintained as optical imaging head assembly 18 traverses rack gear 42 in the directions indicated by double arrow 22.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A drive system for an optical imaging head assembly of a scanner, the drive system comprising:
 a rack having a first side and a second side opposite the first side, the first side including a toothed surface and the second side including a guide surface;
 a pinion engaged with the toothed surface of the rack; and
 at least one guide member contacting the guide surface of the rack.

2. The drive system of claim 1, wherein separation of the pinion from the rack biases the at least one guide member against the rack.

3. The drive system of claim 1, further comprising:
 a motor adapted to drive the pinion and advance the pinion and the at least one guide member along the rack.

4. The drive system of claim 3, further comprising:
 a worm adapted to drive the pinion, wherein the motor is adapted to drive the worm.

5. The drive system of claim 1, wherein the scanner includes a housing, wherein the housing is adapted to support the rack.

6. The drive system of claim 5, further comprising:
 a plurality of contact members adapted to contact the housing of the scanner.

7. The drive system of claim 6, wherein the rack has a longitudinal axis, and wherein the plurality of contact members include a pair of spaced contact members aligned substantially parallel with the longitudinal axis of the rack.

8. The drive system of claim 7, wherein at least one of the contact members is biased in a direction substantially perpendicular to the longitudinal axis of the rack.

9. The drive system of claim 5, wherein the scanner further includes a platen, wherein the housing is adapted to support the platen, and further comprising:
 a plurality of contact members adapted to contact the platen of the scanner.

10. The drive system of claim 9, wherein the rack has a longitudinal axis, and wherein the plurality of contact members include a pair of spaced contact members aligned along an axis oriented substantially perpendicular to the longitudinal axis of the rack.

11. The drive system of claim 10, wherein the plurality of contact members further include a third contact member positioned between and offset from the pair of spaced contact members.

12. The drive system of claim 1, wherein the optical imaging head assembly includes a carriage and a light source, a lens assembly, and a sensor array supported by the carriage,
 wherein the pinion and the at least one guide member are supported by the carriage.

13. The drive system of claim 12, wherein the pinion is adapted to advance the carriage along the rack and the at least one guide member is adapted to guide the carriage along the rack.

14. A system for moving an optical imaging head assembly of a scanner, the system comprising:
 a rack having a first side and a second side opposite the first side, the first side including a toothed surface and the second side including a guide surface;
 a pinion engaging the toothed surface of the rack; and at least one guide member contacting the guide surface of the rack,
wherein the pinion traverses the tooted surface of the rack and the at least one guide member slides along the guide surface of the rack.

15. The system of claim 14, wherein separation of the pinion from the toothed surface of the rack biases the at least one guide member against the guide surface of the rack.

16. The system of claim 14, further comprising:
a worm driving the pinion; and
a motor driving the worm and moving the pinion along the rack.

17. The system of claim 14, wherein the scanner includes a housing, wherein the housing supports the rack, and further comprising:
a plurality of contact members contacting the housing of the scanner.

18. The system of claim 17, wherein the rack has a longitudinal axis, and wherein the plurality of contact members include a pair of spaced contact members aligned substantially parallel with the longitudinal axis of the rack.

19. The system of claim 18, wherein at least one of the contact members is biased in a direction substantially perpendicular to the longitudinal axis of the rack.

20. The system of claim 17, wherein the scanner further includes a platen, wherein the housing supports the platen, and further comprising:
a plurality of contact members contacting the platen of the scanner.

21. The system of claim 20, wherein the rack has a longitudinal axis, and wherein the plurality of contact members include a pair of spaced contact members aligned along an axis oriented substantially perpendicular to the longitudinal axis of the rack.

22. The system of claim 21, wherein the plurality of contact members further include a third contact member positioned between and offset from the pair of spaced contact members.

23. The system of claim 14, wherein the optical imaging head assembly includes a carriage and a light source, a lens assembly, and a sensor array supported by the carriage,
wherein the pinion gear moves the carriage along the rack and the at least one guide member guides the carriage along the rack.

24. A drive system for an optical imaging head assembly of a scanner, the drive system comprising:
a rack having a first side and a second side opposite the first side, the first side including a toothed surface and the second side including a guide surface;
means for moving the optical imaging head assembly along the toothed surface of the rack; and
means for guiding the optical imaging head assembly along the guide surface of the rack.

25. The drive system of claim 24, wherein means for moving the optical imaging head assembly includes means for engaging the toothed surface of the rack.

26. The drive system of claim 24, wherein means for guiding the optical imaging head assembly includes means for contacting the guide surface of the rack.

27. The drive system of claim 24, wherein means for moving the optical imaging head assembly and means for guiding the optical imaging head assembly include means for biasing against the guide surface of the rack.

28. The drive system of claim 24, wherein the scanner includes a housing, wherein the housing supports the rack, and further comprising:
means for contacting the housing and supporting the optical imaging head assembly relative to the housing.

29. The drive system of claim 28, wherein the scanner further includes a platen, wherein the housing supports the platen, and further comprising:
means for contacting the platen and supporting the optical imaging head assembly relative to the platen.

30. A scanner, comprising:
a housing;
a platen supported by the housing;
an optical imaging head assembly supported between the housing and the platen; and
a drive system adapted to move the optical imaging head assembly relative to the housing and the platen,
wherein rho drive system includes a rack having a first side including a toothed surface and a second side opposite the first side including a guide surface, a pinion engaged with the toothed surface of the rack, and at least one guide member contacting the guide surface of the rack.

31. The scanner of claim 30, wherein separation of the pinion from the rack biases he at least one guide member against the rack.

32. The scanner of claim 30, wherein the drive system further includes a plurality of contact members contacting the housing and supporting the optical imaging head assembly relative to the housing.

33. The scanner of claim 30, wherein the drive system further includes a plurality of contact members contacting the platen and supporting the optical imaging head assembly relative to the platen.

34. The scanner of claim 30, wherein the optical imaging head assembly includes a carriage and a light source, a lens assembly, and a sensor array supported by the carriage,
wherein the pinion is adapted to move the carriage along the rack and the at least one guide member is adapted to guide the carriage along the rack.

35. The scanner of claim 34, wherein the drive system further includes a motor supported by the carriage, wherein the motor is adapted to drive the pinion and move the carriage along the rack.

36. A method of moving an optical imaging head assembly of a scanner, the method comprising:
engaging a toothed surface provided on a first side of a rack with a pinion supported by the optical imaging head assembly;
contacting a guide surface provided on a second side of the rack opposite the first side of the rack with at least one guide member supported by the optical imaging head assembly; and
driving the pinion, including moving the optical imaging head assembly along the rack.

37. The method of claim 36, wherein moving the optical imaging head assembly along the rack includes traversing the toothed surface of the rack with the pinion and sliding along the guide surface of the rack with the at least one guide member.

38. The method of claim 36, wherein moving the optical imaging head assembly along the rack includes biasing the at least one guide member against the guide surface of the rack.

39. The method of claim 36, wherein driving the pinion includes driving the pinion with a motor supported by the optical imaging head assembly.

40. The method of claim 36, wherein the scanner includes a housing, wherein the housing supports the rack, and further comprising:

contacting the housing of the scanner and supporting the optical imaging head assembly relative to the housing.

41. The method of claim 40, wherein contacting the housing of the scanner includes contacting the housing at two paints aligned substantially parallel with a longitudinal axis of the rack.

42. The method of claim 40, wherein the scanner further includes a platen, wherein the housing supports the platen, and further comprising:

contacting the platen of the scanner and supporting the optical imaging head assembly relative to the platen.

43. The method of claim 42, wherein contacting the platen of the scanner includes contacting the platen at two points aligned along an axis oriented substantially perpendicular to a longitudinal axis of the rack.

44. The method of claim 43, wherein contacting the platen of the scanner further includes contacting the platen at a third point positioned between and offset from the two points.

45. The method of claim 36, wherein the optical imaging head assembly includes a carriage and a light source, a lens assembly, and a sensor may supported by the carriage, wherein moving the optical imaging head assembly along the rack includes traversing the rack with the carriage.

* * * * *

UNITED STATES PATENT AND TRADEMARK OFFICE
CERTIFICATE OF CORRECTION

PATENT NO. : 7,253,930 B2 Page 1 of 1
APPLICATION NO. : 10/199046
DATED : August 7, 2007
INVENTOR(S) : Steven Wayne Hendrix et al.

It is certified that error appears in the above-identified patent and that said Letters Patent is hereby corrected as shown below:

In column 7, line 3, in Claim 14, delete "tooted" and insert -- toothed --, therefor.

In column 8, line 15, in Claim 30, delete "rho" and insert -- the --, therefor.

In column 8, line 22, in Claim 31, delete "he" and insert -- the --, therefor.

In column 9, line 5, in Claim 41, delete "paints" and insert -- points --, therefor.

In column 10, line 9, in Claim 45, delete "may" and insert -- array --, therefor.

Signed and Sealed this

Fifth Day of May, 2009

JOHN DOLL
*Acting Director of the United States Patent and Trademark Office*